(12) United States Patent
Randhawa et al.

(10) Patent No.: US 10,343,196 B2
(45) Date of Patent: Jul. 9, 2019

(54) IN-PIPELINE MAINTENANCE, DELIVERY AND MANAGEMENT OF SENSORS

(71) Applicant: International Business Machines Corporation, Armonk, NY (US)

(72) Inventors: Sukanya Randhawa, Bangalore (IN); Ninad D. Sathaye, Bangalore (IN); Ashwin Srinivas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/342,303

(22) Filed: Nov. 3, 2016

(65) Prior Publication Data

US 2018/0120811 A1     May 3, 2018

(51) Int. Cl.
    *B08B 9/04*     (2006.01)
    *B08B 9/055*     (2006.01)
    *F16L 55/26*     (2006.01)
    *F16L 55/38*     (2006.01)
           (Continued)

(52) U.S. Cl.
CPC ............... *B08B 9/04* (2013.01); *F16L 55/26* (2013.01); *F16L 55/40* (2013.01); *F16L 55/48* (2013.01); *B08B 9/0557* (2013.01); *F16L 55/38* (2013.01)

(58) Field of Classification Search
None
See application file for complete search history.

(56) References Cited

U.S. PATENT DOCUMENTS

| 5,322,569 A | 6/1994 | Titus et al. |
|---|---|---|
| 8,429,952 B1 | 4/2013 | Bringhurst et al. |

(Continued)

FOREIGN PATENT DOCUMENTS

WO     201604407 A1     3/2016

OTHER PUBLICATIONS

Aisopou et al., In-pipe water quality monitoring in water supply systems under steady and unsteady state flow conditions: A quantitative assessment. Water Research, vol. 46, Issue 1, Jan. 1, 2012, pp. 235-246.

(Continued)

*Primary Examiner* — Whitney Moore
(74) *Attorney, Agent, or Firm* — Ryan, Mason & Lewis, LLP

(57) ABSTRACT

Methods, systems, and computer program products for in-pipeline maintenance, delivery and management of sensors are provided herein. A multi-component, in-pipeline sensor management system includes a self-propelled sensor explorer component comprising (i) one or more communication sub-components and (ii) one or more navigation assistance sub-components, wherein the self-propelled sensor explorer component is configured to move through a liquid within a pipeline; a sensor coupling unit comprising one or more attachment structures, wherein the one or more attachment structures enable the system to attach to one or more sensors within the pipeline; and a sensor maintenance unit comprising (i) a cleansing unit, wherein the cleansing unit comprises (a) an inlet valve for one or more cleaning liquids and (b) an outlet valve for one or more waste liquids, (ii) a cleaning liquid storage component coupled to the inlet valve, and (iii) a waste liquid collector coupled to the outlet valve.

14 Claims, 12 Drawing Sheets

(51) Int. Cl.
*F16L 55/40* (2006.01)
*F16L 55/48* (2006.01)

(56) References Cited

U.S. PATENT DOCUMENTS

| | | | |
|---|---|---|---|
| 2009/0078283 A1* | 3/2009 | Phipps | F16L 55/38 134/8 |
| 2009/0317293 A1* | 12/2009 | Street | A61L 2/084 422/28 |
| 2015/0001158 A1 | 1/2015 | Valladares et al. | |
| 2016/0129487 A1 | 5/2016 | Zheng et al. | |
| 2017/0219157 A1* | 8/2017 | Ethirajan | H04W 4/70 |

OTHER PUBLICATIONS

Kim et al., SPAMMS: A sensor-based pipeline autonomous monitoring and maintenance system. COMSNETS, 2010.

Stoianov, I., PIPENET: A Wireless Sensor Network for Pipeline Monitoring, 2007.

Murphy et al., Development of a wireless sensor network for collaborative agents to treat scale formation in oil pipes, EWSN, 2007.

Nassirael et al., Concept and design of a fully autonomous sewer pipe inspection mobile robot, Robotics and Automation, IEEE, 2007.

Peleg, A. Water technology, 2014, Investment in smart water networks on the rise.

Adler, L. The Urban Internet of Things, http://datasmart.ash.harvard.edu/news/article/the-urban-internet-of-things-727, Aug. 31, 2015.

YSI, 10 Tips to prevent Bio Fouling on Water Quality Instruments, YSI Report, 2013.

Elfes, A., Sonar-based real-world mapping and navigation, IEEE Journal on Robotics and Automation, vol. 3, No. 3, pp. 249-265, Jun. 1987.

Lee et al., A reversible wet/dry adhesive inspired by mussels and geckos, Nature 448, 338-341, Aug. 2007.

* cited by examiner

IN-PIPELINE MAINTENANCE, DELIVERY AND MANAGEMENT OF SENSORS

FIELD

The present application generally relates to information technology, and, more particularly, to sensor management.

BACKGROUND

The reliability of sensors located within pipelines can be severely degraded when the sensing element is compromised due to one or more factors. Such factors can include organic bio-fouling, inorganic and/or limescale build-up, etc. Traditionally, utilities have used online sensors for process control outside of distribution systems such as treatment plants. Additionally, existing monitoring approaches also include in-pipe sensors. However, such approaches include significant costs and cause disruptions related to installing and maintaining the sensors.

SUMMARY

In one embodiment of the present invention, systems and techniques for in-pipeline maintenance, delivery and management of sensors are provided. An exemplary multi-component, in-pipeline sensor management system can include a self-propelled sensor explorer component comprising (i) one or more communication sub-components and (ii) one or more navigation assistance sub-components, wherein the self-propelled sensor explorer component is configured to move through a liquid within a pipeline. Such a system can also include a sensor coupling unit comprising one or more attachment structures, wherein the one or more attachment structures enable the system to attach to one or more sensors within the pipeline. Further, such a system can also include a sensor maintenance unit comprising (i) a cleansing unit, wherein the cleansing unit comprises (a) an inlet valve for one or more cleaning liquids and (b) an outlet valve for one or more waste liquids, (ii) a cleaning liquid storage component coupled to the inlet valve, and (iii) a waste liquid collector coupled to the outlet valve. Also, the self-propelled sensor explorer component, the sensor coupling unit, and the sensor maintenance unit can be physically linked and communicatively linked within the system.

In yet another embodiment of the invention, an exemplary computer-implemented method can include detecting a sensor within a pipeline via an in-pipeline sensor management system, determining a path for the in-pipeline sensor management system to travel to the detected sensor, and automatically attaching the in-pipeline sensor management system to the detected sensor upon a determination that the in-pipeline sensor management system has completed the path and reached the detected sensor. Such a method can also include determining one or more maintenance operations to be performed on the detected sensor, wherein such performing is based on (i) one or more items of real-time data pertaining to the sensor, obtained via the in-pipeline sensor management system, and (ii) one or more historical operation records pertaining to the detected sensor. Further, such a method can include performing the one or more determined maintenance operations, via the in-pipeline sensor management system, on the detected sensor, and automatically detaching the in-pipeline sensor management system from the detected sensor upon a determination that the one or more determined maintenance operations have been completed.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes in-pipeline maintenance, delivery and management of sensors. At least one embodiment of the invention includes performing maintenance (such as cleaning) of sensors located inside of a pipeline using a multi-component system. Such an embodiment can include performing maintenance and/or cleaning of an in-pipeline sensor by automatically attaching and detaching a multi-component system to the sensor, wherein the multicomponent system includes a self-propelled sensor explorer configured to move along or against the flow direction (of the liquid, such as water, contained within the pipeline). Additionally, such an embodiment can also include engaging a (telescopic) mechanism using nano-fabricated synthetic adhesive elements that enable automatic attachment and detachment of the multi-component system to the sensor body.

Upon attachment of the multi-component system to the sensor, the multi-component system can carry out one or more maintenance tasks (such as cleaning) with respect to the sensor. Additionally, such maintenance tasks can include obtaining one or more streams of data and/or information such as, for example, water flow rates, infrastructure conditions (of pipelines), and liquid/water quality. As further detailed herein, implementation of such a multi-component system can reduce the frequency of re-calibration required for in-pipeline sensors, and extend the life of such sensors as a result of routine cleaning. Further, the techniques described herein advantageously require minimal human intervention.

Figure 1:
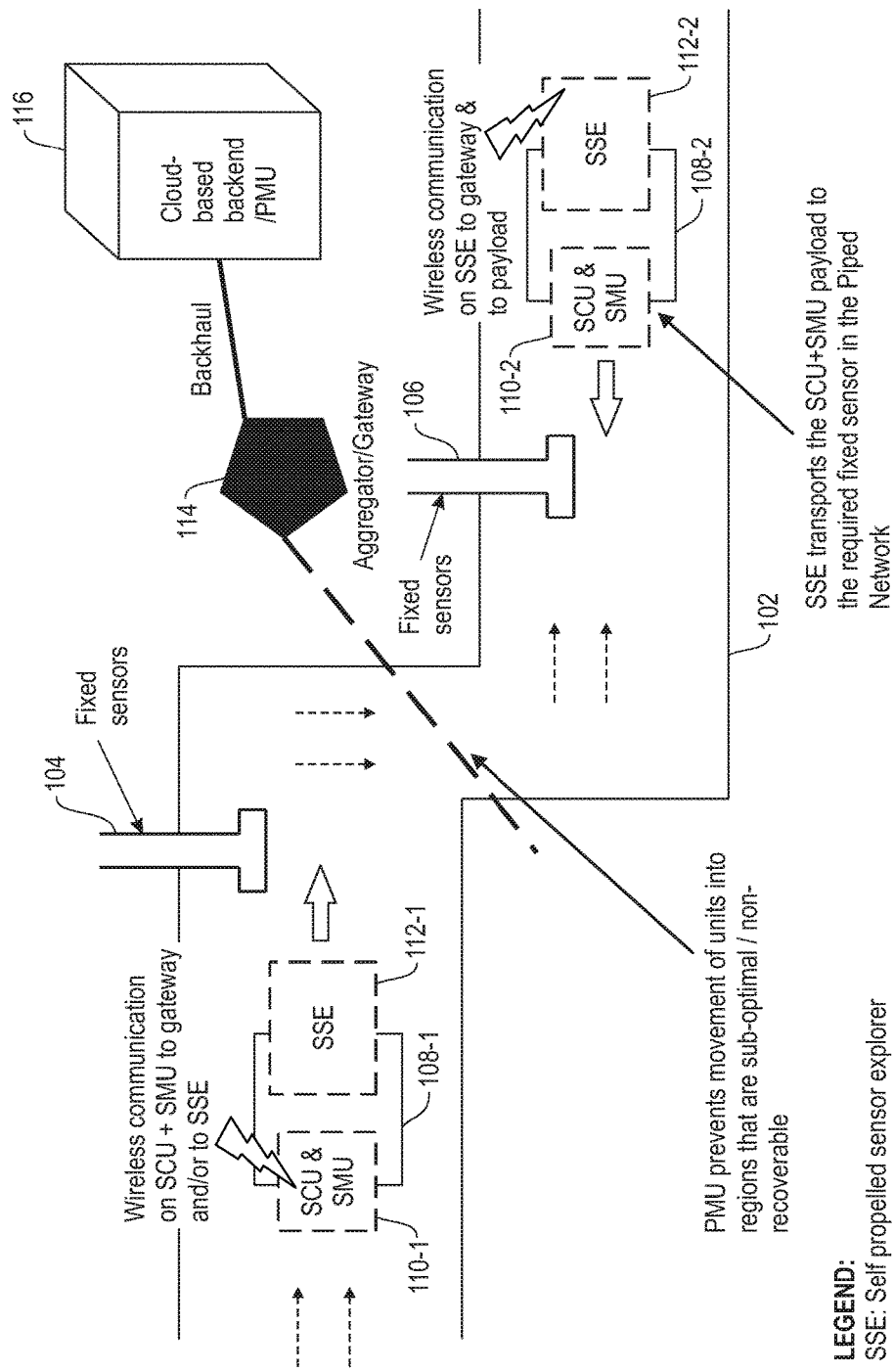
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a pipeline 102 with fixed sensors 104 and 106 positioned therein. Additionally, FIG. 1 depicts multi-component systems 108-1 and 108-2 within the pipeline 102, as well as an aggregator (also referred to herein as a gateway) 114 positioned outside of the pipeline 102, wherein the aggregator 114 is communicatively connected to a cloud-based backend predictive management unit (PMU) 116. As also illustrated in FIG. 1, multi-component system 108-1 includes a sensor coupling unit (SCU) and sensor maintenance unit (SMU) 110-1 as well as a self-propelled sensor explorer (SSE) 112-1. Similarly, multi-component system 108-2 includes a sensor coupling unit and sensor maintenance unit 110-2 as well as a self-propelled sensor explorer 112-2.

Self-propelled sensor explorers 112 are configured to move along or against the flow direction within the pipeline 102. Additionally, self-propelled sensor explorers 112 host a deployable mechanism for cleaning sensors, and contain one or more sub-components for effective navigation in pipeline 102 networks. Such sub-components can include, for example, a sub-component configured for detecting the presence and/or location of sensors, and a sub-component configured for maintaining the position of the multi-component system 110 in the pipeline 102 (against the fluid flow). In one or more embodiments of the invention, such sub-components can also include one or more camera attachments.

Additionally, the predictive management unit 116 can include fault diagnostics and predictive maintenance capabilities, wherein the predictive management unit formulates predictions based on in-pipe environment information and other related data. As used herein, fault diagnostics can be performed to identify one or more problems with installed field sensors. For example, identifiable problems can include issues such as low battery, sensor-reading drift, communication failures, etc. Additionally, the predictive management unit 116 can generate predictions with respect to replacement, maintenance and/or re-calibration that may be required for one or more sensors based on a projected long-term impact of contamination and/or impurities in the pipeline. Accordingly, in one or more embodiments of the invention, the predictive management unit 116 can provide adaptive component management of multi-component systems 108.

As also depicted in FIG. 1, an aggregator/gateway acts as a bi-directional communication-bridge, gathering data from the sensing elements and transporting such data to the backend 116 either directly or after carrying out one or more analysis actions in-situ.

Figure 2:
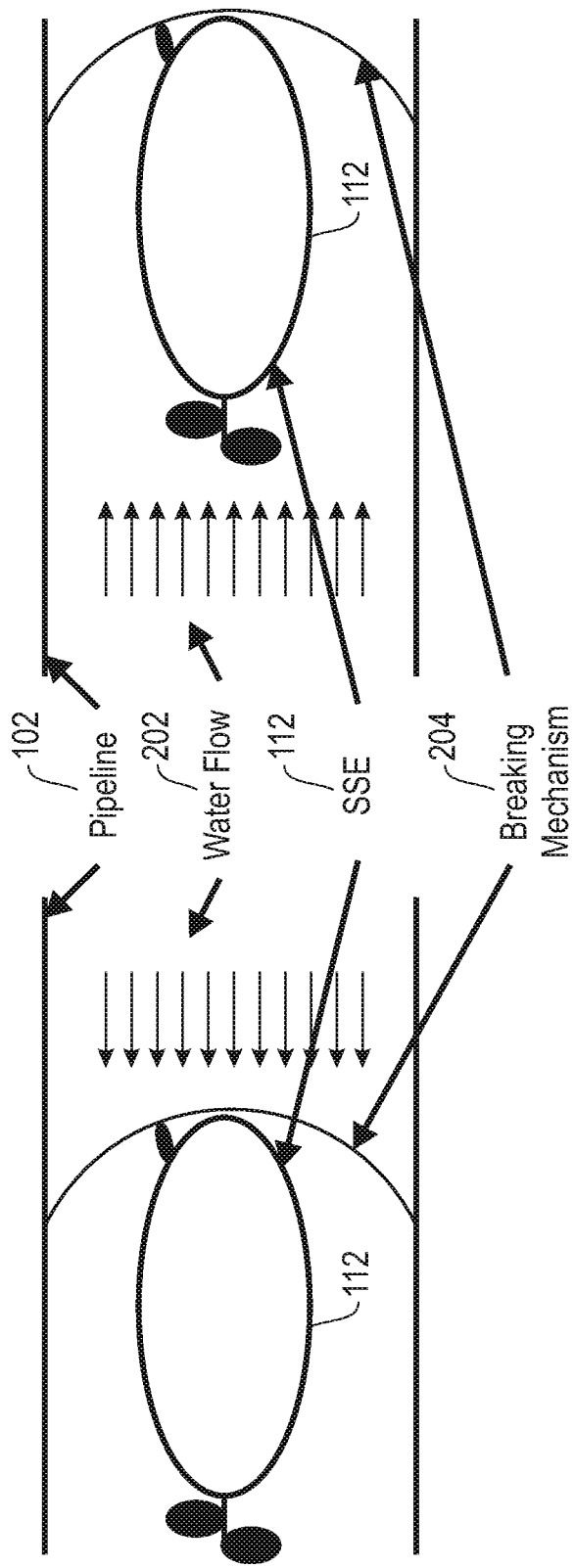
FIG. 2 is a diagram illustrating a self-propelled sensor explorer, according to an exemplary embodiment of the invention.

FIG. 2 is a diagram illustrating a self-propelled sensor explorer 112, according to an exemplary embodiment of the invention. In one or more embodiments of the invention, self-propelled sensor explorers 112 can be underwater vehicles with self-propelling properties, communication capabilities, and navigation aids. Additionally, breaking mechanisms 204 enable the self-propelled sensor explorers 112 to remain still at any particular point within the pipeline, preventing drift. As detailed herein, conditions (such as changes to a liquid/water flow 202, for example) within a pipeline 102 can move the self-propelled sensor explorer 112 off of a predicted and/or planned path which is pre-optimized. In response, at least one embodiment of the invention can include correcting for the drift and moving the self-propelled sensor explorer 112 back onto the original path via one or more localized optimizations. As used herein, localized optimizations refer to calculations made by the self-propelled sensor explorer 112 on the most optimized path from its current position to the desired destination, taking into consideration one or more local factors such as flow rate and remaining battery power.

Such an embodiment facilitates a global optimization which is evaluated in the compute heavy back-end infrastructure (such as the predictive management unit 116 of FIG. 1) that can override the localized optimizations. As used herein, global optimization can determine, for example, which is the best sub-set of sensors needing maintenance, and which set of self-propelled sensor explorers can deliver such action in the most efficient manner, considering one or more constraints such as distance to sensors, pipeline layout, priority of maintenance, etc. Additionally, such an embodiment can consider the elasticity in sensor maintenance requirements, as well as the energy and in-pipe environment constraints for each self-propelled sensor explorer 112 both in correcting to the pre-computed ideal path and a newly-computed path from the current position. In-pipe environment constraints can include, for example, flow conditions, topographical changes which inhibit SSE movement, trip time, etc. One or more embodiments of the invention can include relaxing such constraints from one or more historic patterns (for example, a flow can be reduced due to a pump being switched off at a given periodicity, as observed from previous cycles). Such an embodiment can, therefore, include enabling an adaptive management of the self-propelled sensor explorer 112 and the sensor coupling units during operation of the multi-component system 108.

Figure 3A:
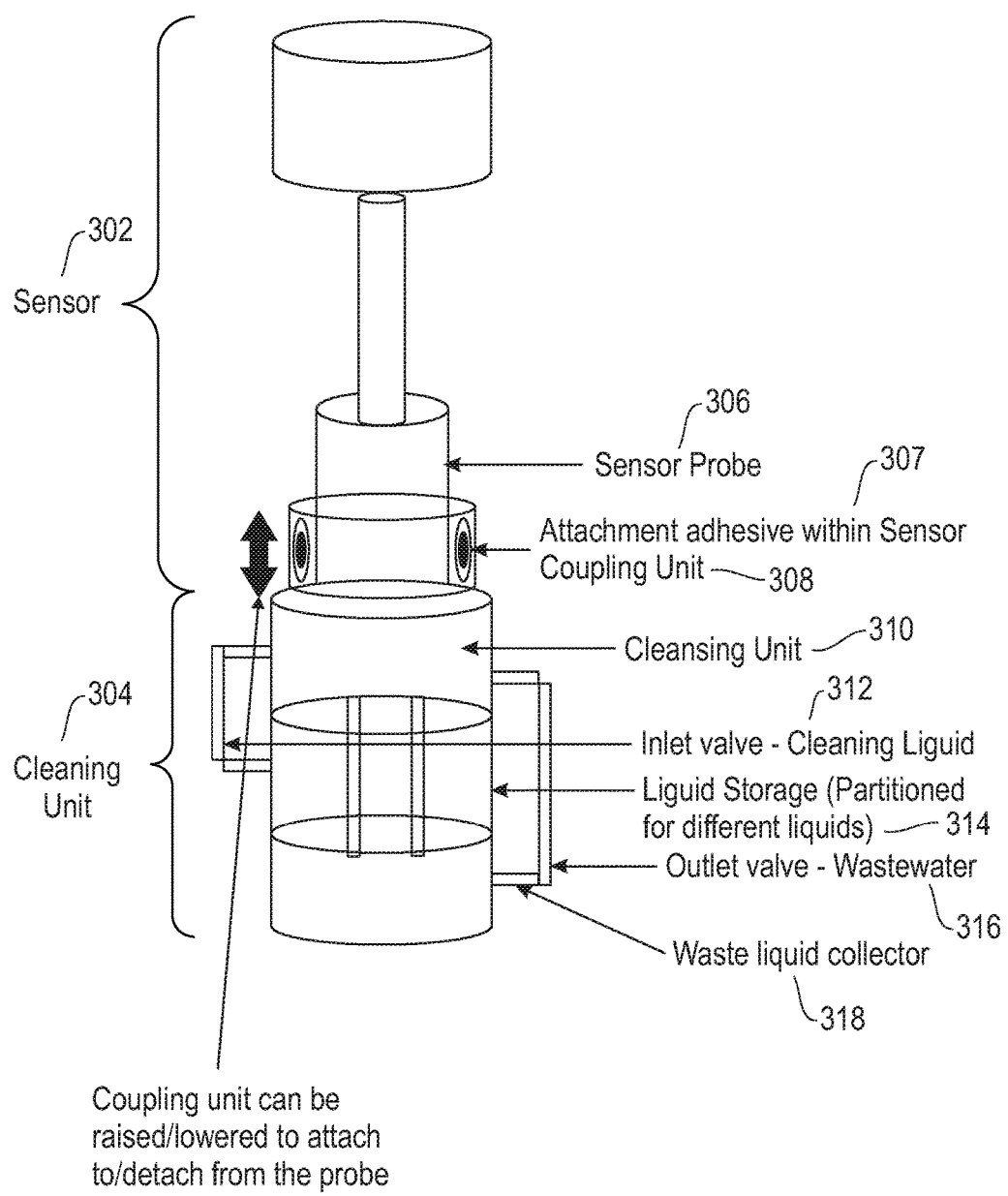
FIG. 3A is a diagram illustrating a sensor maintenance unit, according to an exemplary embodiment of the invention.

FIG. 3A is a diagram illustrating a sensor maintenance unit, according to an exemplary embodiment of the invention. By way of illustration, FIG. 3A depicts a sensor portion 302 and a cleaning unit portion 304. The sensor 302 includes a sensor probe 306 and an attachment adhesive 307 within a sensor coupling unit 308. Also, as noted in FIG. 3A, the coupling unit 308 can be raised and lowered to attach or detach from the probe 306. The cleaning unit 304 includes a cleansing unit 310, an inlet valve 312 for a cleaning liquid, a liquid storage component 314 (which can be partitioned for different liquids), an outlet valve 316 for waste liquids, and a waste liquid collector 318.

As depicted in FIG. 3A, the coupling unit 308 attaches, via adhesive structures 307, the entire assembly to the sensor probe 306 that requires maintenance. The cleaning unit 304 includes the cleansing chamber 310, the inlet valve 312, the outlet valve 316, the liquid storage 314, and the waste liquid collector 318. During sensor cleaning, the cleaning liquid is pumped from the liquid storage 314 through the inlet valve 312 and onto the probe 306. Additionally, the waste liquid is collected via the outlet valve 316 into the waste liquid collector 318.

In accordance with one or more embodiments of the invention, sensor maintenance units (contained within component 110) are transported by sensor explorers 112 and can contain, as noted, one or more cleansing units 310 (such as optical cleaning elements and/or chemical cleaning elements), one or more cleansing element delivery mechanisms (such as inlet valve 312, for example), and a storage chamber for a cleansing liquid (via component 314, for example) and/or one or more waste liquids (via component 318, for example). Optical cleaning elements can include, for example, light-emitting diode (LED) sources of ultra-violet (UV) light, and chemical cleaning elements can include, for example, mild acid, C-spray, and water.

With respect to the above-noted optical cleaning elements, consider an example embodiment of the invention that includes performing optical cleaning of a sensing element using LED sources of UV light. Such a cleaning can, for instance, dissolve most of the deposits on the sensing element. Further, assume that some traces of the dissolved deposits remain on the sensing element. In such a scenario, one or more embodiments of the invention can include implementing an additional mechanism, such as, for example, a cleaning liquid spray, to assist in removing the remaining traces.

Further, sensor maintenance units can also include energy supply and harvesting mechanisms, as well as, in one or more embodiments of the invention, one or more camera attachments. As used herein, an energy supply can include attached rechargeable batteries located within the SSE/SMU, and energy harvesting mechanisms utilize the flowing liquid/water to generate current (micro-turbine) that recharges one or more batteries. In connection therewith, at least one embodiment of the invention can include energy harvesting for sensor maintenance and coupling units via one or more micro-turbines placed within the units, which facilitate energy harvesting from flowing liquid/water.

Figure 3B:
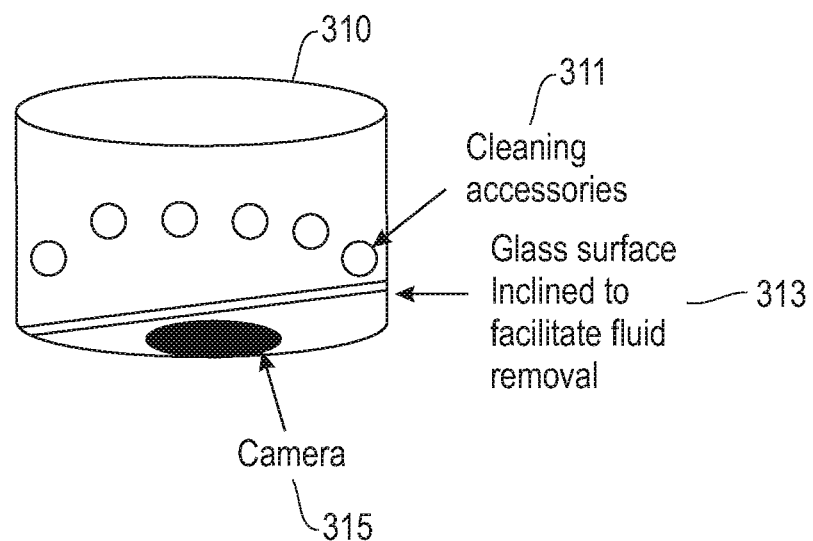
FIG. 3B and FIG. 3C are diagrams illustrating variants of the cleansing unit within the sensor maintenance unit, according to an exemplary embodiment of the invention.
Figure 3C:
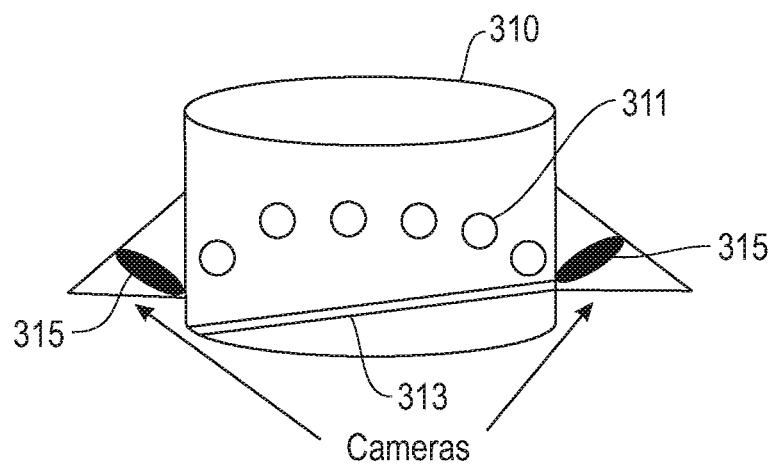

FIG. 3B and FIG. 3C are diagrams illustrating variants of the cleansing unit 310 within the sensor maintenance unit, according to an exemplary embodiment of the invention. By way of illustration, FIG. 3B depicts cleaning accessories 311, a glass surface 313 inclined to facilitate fluid removal, and a camera 315 located within the cleansing unit 310. Additionally, FIG. 3C depicts cleaning accessories 311, a glass surface 313 inclined to facilitate fluid removal, and a pair of cameras 315 located outside of the cleansing unit. Placing the camera(s) 315 within the unit can render the design simpler, and placing the camera(s) 315 outside of the unit can eliminate blurry image problems. In one or more embodiments of the invention, the cleaning accessories can include controllable valves (such as valves 312 and 314 in FIG. 3A, for example) to be used in connection with a liquid spray. Such a liquid can include, for example, a mild acid such as hydrogen chloride (HCl) (which can be used for limescale removal, and for which a follow-up water rinse is required), a C-spray (a nano-polymer coating that inhibits bio-fouling build-up on surfaces, and for which a follow-up water rinse is required), and water (which can be used for general cleaning). Additionally, in one or more embodiments of the invention, the cleaning accessories 311 can include light-emitting diodes. Such an embodiment can also include minimal liquid storage and waste collection compartments (such as components 314 and 316, respectively). Further, the camera(s) 315 can be used to capture images of the sensing element before and after cleaning. Such images can assist in determining the quality of maintenance being carried out.

Figure 3D:
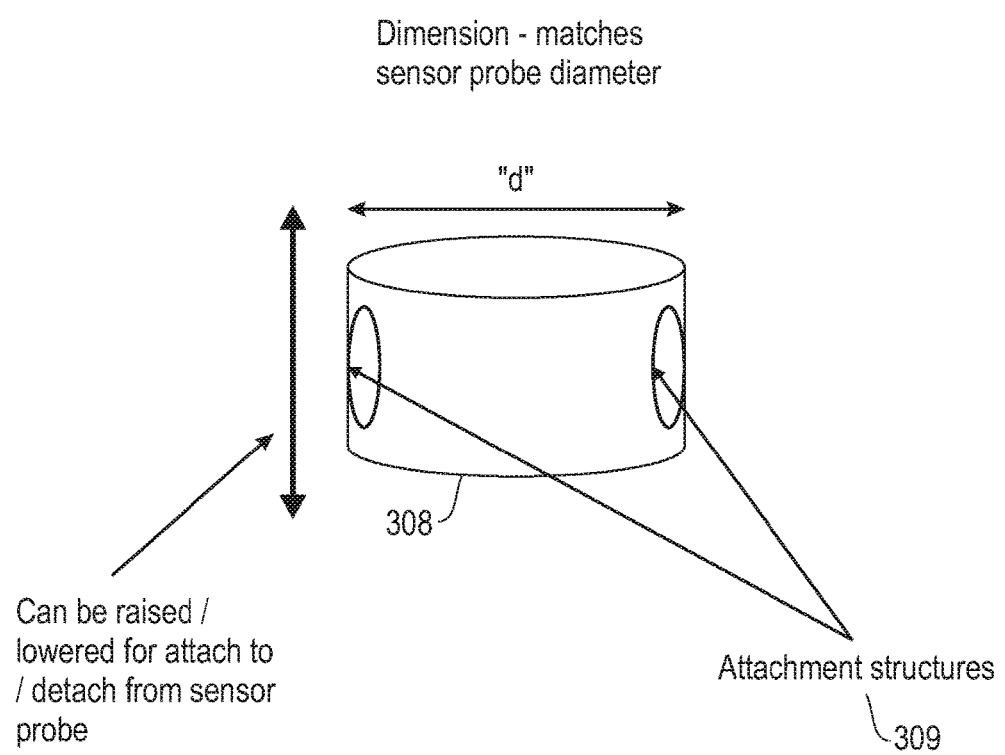
FIG. 3D is a diagram illustrating the sensor coupling unit within the sensor maintenance unit, according to an exemplary embodiment of the invention.

FIG. 3D is a diagram illustrating the sensor coupling unit 308 within the sensor maintenance unit, according to an exemplary embodiment of the invention. By way of illustration, FIG. 3D depicts attachment structures 309 positioned on the exterior surface of the sensor coupling unit 308. Also, as depicted in FIG. 3D, an example configuration of the sensor coupling unit 308 includes a certain diameter (for instance, a 400 nanometer (nm) pillar diameter) as well as a certain spacing between the attachment structures (for instance, 1 millimeter (mm) spacing).

Also, the attachment structures 309 can include nano-pillared structures coated with a synthetic glue for adhesion (such as, for example, an organic catechol coating, which can improve wet adhesion). Additionally, the attachment structures provide means to attach the multi-component system 108 to a sensor. As also noted herein, in one or more embodiments of the invention, the sensor coupling unit 308 can be raised and lowered for attachment to and detachment from a sensor probe.

Figure 4:
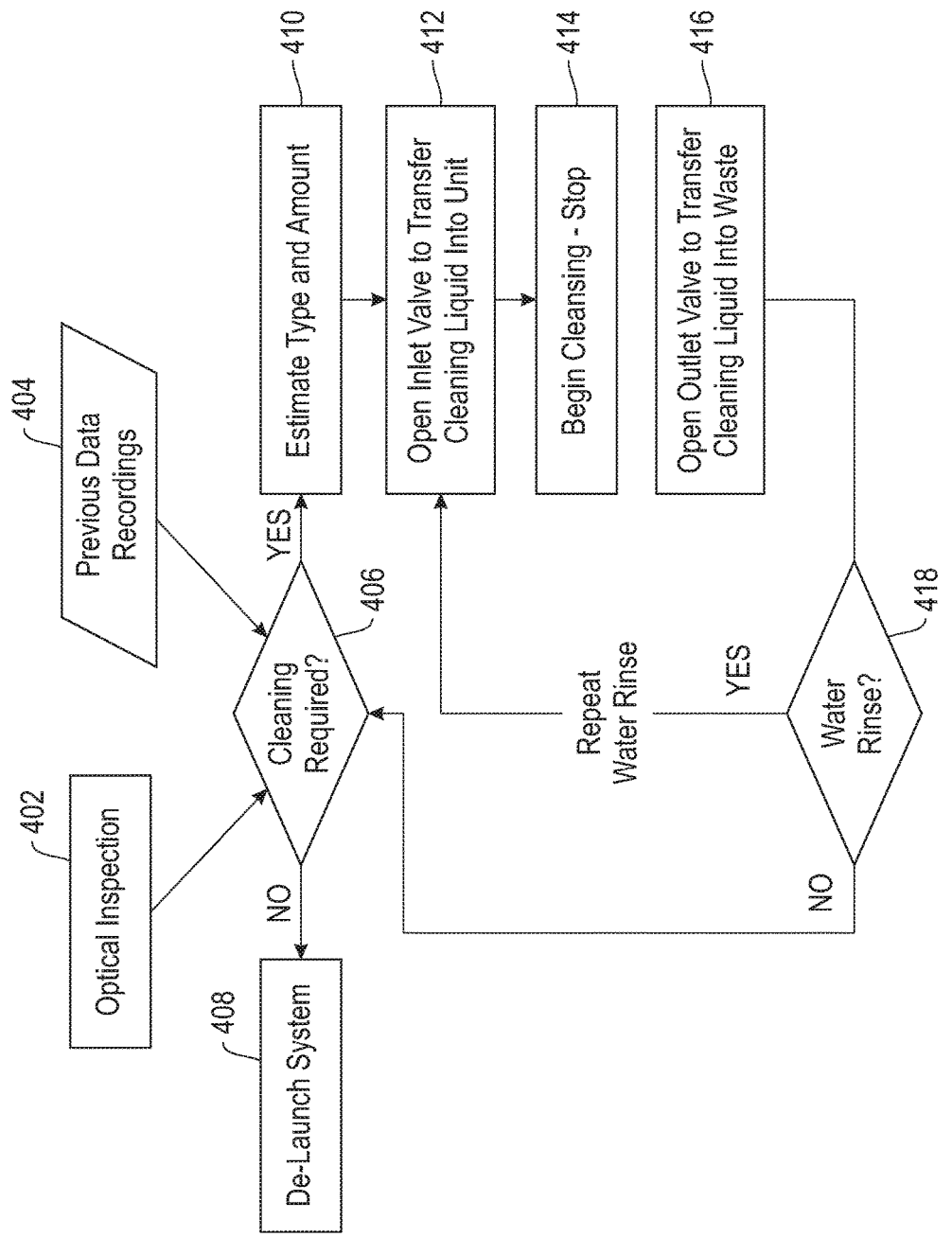
FIG. 4 is a diagram illustrating a flow diagram detailing workings of the sensor maintenance unit, according to an exemplary embodiment of the invention.

FIG. 4 is a diagram illustrating a flow diagram detailing workings of the sensor maintenance unit, according to an exemplary embodiment of the invention. Step 402 includes performing an optical inspection of a sensor. Based on this optical inspection and one or more previous data recordings 404, step 406 includes determining whether or not a cleaning of the sensor is required. If no (that is, a cleaning is not required), then the system de-launches in step 408. If yes (that is, a cleaning is required), then step 410 includes estimating the type and amount of cleaning required. The image captured by the camera(s) can be analyzed to understand the type of deposit and the thickness thereof. Such information, along with previous maintenance records, sensor-value drift, and additional related information can facilitate estimating the type and quantity of cleaning to be carried out.

Additionally, step 412 includes opening an inlet valve to transfer a cleaning liquid into the cleansing unit of the system, and step 414 includes carrying out the cleaning process. Step 416 includes opening an outlet valve to transfer the cleaning liquid into a waste compartment. Further, step 418 includes determining whether or not a water rinse is required. Such a determination can be based, for example, on the type of cleaning liquid used in the cleaning process. If yes (that is, a water rinse is required), the sequence returns to step 412, and the inlet valve is opened to transfer water into the cleansing unit of the system (and the water rinse is subsequently carried out). If no (that is, a water rinse is not required), then the sequence returns to step 406.

Figure 5:
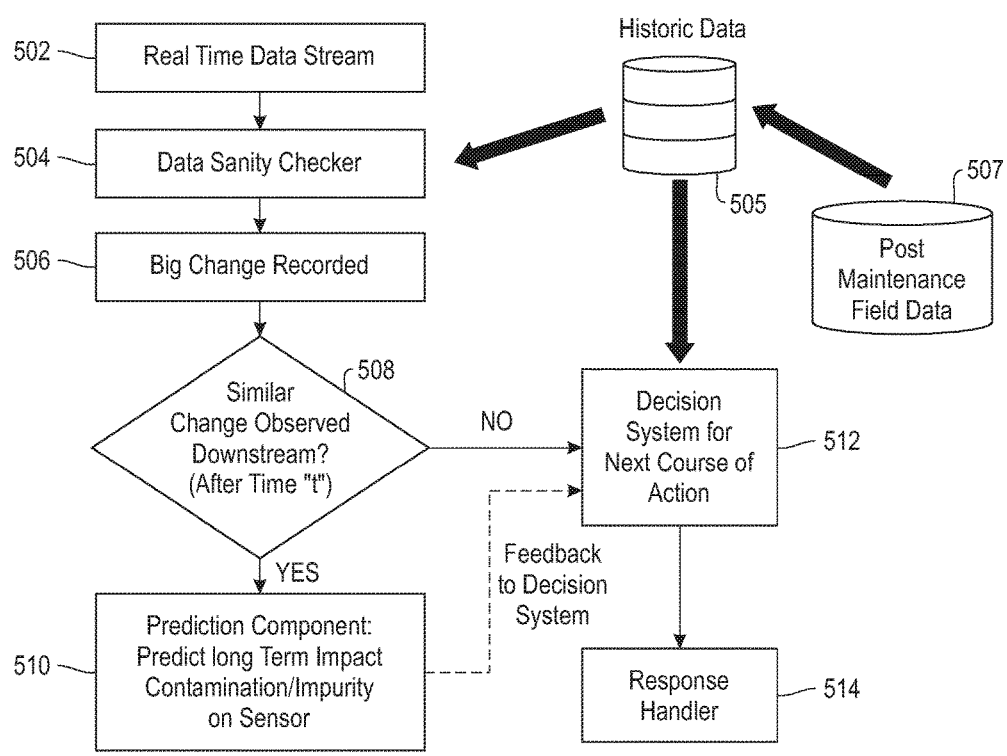
FIG. 5 is a diagram illustrating a flow diagram detailing workings of the predictive management unit, according to an exemplary embodiment of the invention.

FIG. 5 is a diagram illustrating a flow diagram of workings of the predictive management unit, according to an exemplary embodiment of the invention. Step 502 includes obtaining a real-time data stream from a sensor. Step 504 includes implementing a data check with respect to the obtained real-time data stream as well as one or more items of historic data 505. Historic data 505 can include, for example, sensor readings, maintenance records, sensor state predictions, etc., and such data 505 can receive inputs from post maintenance field data, which can include cleaning time(s), amount(s) of liquid used, camera feedback on sensor quality post-maintenance, etc. Implementing a data sanity checker in step 504 can include, for example, comparing the real-time data stream with a 30 day moving average. In response to implementing the data sanity checker in step 504, step 506 can include recording a big or significant change. Such a change 506 can include, for example, a high chlorine content detected for the past seven days.

Step 508 includes determining whether a similar change (to the change recorded in step 506) can be observed downstream (for example, after a given time "t"). If no (that is, a similar change is not observed downstream), then a decision is made by the system for a next course of action in step 512. If yes (that is, a similar change is observed downstream), then a prediction component predicts a long-term impact (for example, with respect to contamination or impurity) on the sensor in step 510. Such a prediction can then be provided to the decision system as feedback. Further, subsequent to the decision being made by the decision system in step 512, the output of step 512 is given as input to a response handler 514. For example, if the decision (of step 512) is "Needs Maintenance," then such a message is output to the response handler 514, which triggers the appropriate actions needed to send the SSE to the required location.

Accordingly, example decisions (made via the decision system in step 512) can include a need for sensor maintenance, a need for sensor replacement, a need for sensor re-calibration, etc. Additionally, based on feedback from prediction components and/or cleaning systems such as time, amount of liquid used, maintenance records, etc., at least one embodiment of the invention can include determining sub-optimal portions of a pipeline that could be effecting liquid/water quality, and hence sensor elements, due to corrosion, gaseous pockets, leaks, etc. within the pipeline. An analysis such as detailed in FIG. 5 can be utilized, for example, to optimize the costs of maintenance and aid in decision-making around system design (for instance, design with respect to different components such as pipe material, sensor selection, etc.).

Figure 6:
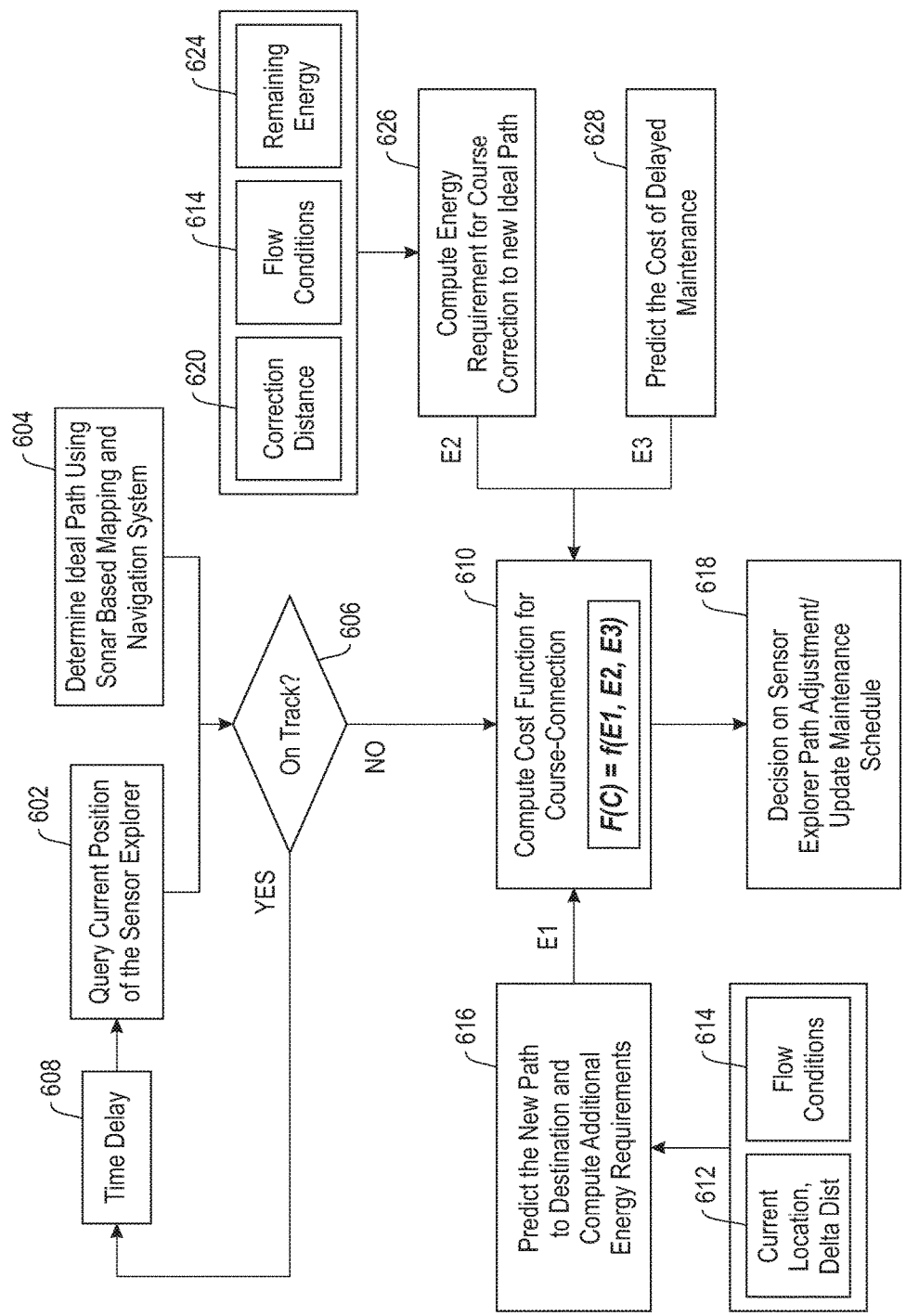
FIG. 6 is a diagram illustrating a flow diagram detailing route optimization based on a sonar navigation system, according to an exemplary embodiment of the invention.

FIG. 6 is a diagram illustrating a flow diagram detailing route optimization based on a sonar navigation system, according to an exemplary embodiment of the invention. Step 602 includes querying the current position of the sensor explorer, and step 604 includes determining an ideal path using a sonar-based mapping and navigation system. Based on the current position and determined ideal path, step 606 includes determining whether the sensor explorer is on-track. If yes (that is, the sensor explorer is on the determined ideal path), a time delay is implemented in step 608 prior to returning to step 602. If no (that is, the sensor explorer is not on the determined ideal path), then step 610 includes computing a cost function for carrying out a course correction of the sensor explorer.

In one or more embodiments of the invention, such a cost function can include the following: $F(C)=f(E1, E2, E3)$, wherein E1, E2, and E3 are derived from steps 616, 626, and 628, respectively, of FIG. 6. Specifically, step 616 includes predicting a new path for the sensor explorer to a given destination, and computing one or more additional energy requirements related to the new path. The new path prediction and additional energy requirement computation are based on the current location of the sensor explorer, and the distance 612 between that current location and the given destination. Additionally, the new path prediction and additional energy requirement computation are also based on one or more flow conditions 614 within the pipeline. Flow conditions can include, for example, the velocity of the liquid within the pipeline, the direction of the liquid flow, and the pipeline incline.

Also, based on a correction distance 620, flow conditions 614, and the remaining energy of the sensor explorer 624, step 626 includes computing an energy requirement for a course correction to a new ideal path. Further, step 628 includes predicting the cost of delayed maintenance (due to the course correction).

Accordingly, based on the cost function computation in step 610, step 618 includes making a decision on the sensor explorer path adjustment and updated maintenance schedule. By way of illustration, an example decision (made in step 618) can include a decision that a time-sensitive cleaning of a sensor is required, given the following circumstances. A sensor explorer is expected to complete a maintenance task by 11:40 AM, and at approximately 12:00 PM, the flow conditions in the pipeline are expected to change, which would impact the sensor explorer movement (for example, more energy would be spent to move the sensor explorer to the next location).

As detailed herein, at least one embodiment of the invention includes a multi-component, in-pipeline sensor management system. Such a system can include a self-propelled sensor explorer component comprising (i) one or more communication sub-components and (ii) one or more navigation assistance sub-components, wherein the self-propelled sensor explorer component is configured to move through a liquid within a pipeline. The navigation assistance sub-components can include a sub-component configured for detecting the location of one or more sensors within the pipeline, a sub-component configured for maintaining the position of the system in the pipeline, and/or one or more cameras.

Such a system can also include a sensor coupling unit comprising one or more attachment structures, wherein the one or more attachment structures enable the system to attach to one or more sensors within the pipeline. The attachment structures can include one or more nano-pillared structures coated with a synthetic glue (such as, for example, an organic catechol coating). Also, in one or more embodiments of the invention, the sensor coupling unit can include a telescopic mechanism configured to raise and lower the sensor coupling unit.

Further, such a system can also include a sensor maintenance unit comprising (i) a cleansing unit, wherein the cleansing unit comprises (a) an inlet valve for one or more cleaning liquids and (b) an outlet valve for one or more waste liquids, (ii) a cleaning liquid storage component coupled to the inlet valve, and (iii) a waste liquid collector coupled to the outlet valve. In one or more embodiments of the invention, the cleaning liquid storage component can be partitioned for storage of one or more distinct cleaning liquids and collection of one or more waste liquids. Also, the cleaning liquids can include one or more chemical cleaning liquids. Further, in one or more embodiments of the invention, the cleansing unit can include a surface inclined to facilitate liquid removal, one or more cameras, and/or one or more light-emitting diodes for optical cleaning.

Also, with respect to such a system, the self-propelled sensor explorer component, the sensor coupling unit, and the sensor maintenance unit can be physically linked and communicatively linked within the system.

Additionally, in one or more embodiments of the invention, such a system can also include a predictive management unit that includes one or more system diagnostics components, wherein the one or more system diagnostics components formulate one or more system-related predictions based on (i) information pertaining to the environment within the pipeline and (ii) communication from the system, and wherein the predictive management unit is wirelessly linked to the system. Further, in one or more embodiments of the invention, such a system can also include one or more energy producing mechanisms that utilize liquid flowing within the pipeline to produce energy.

Figure 7:
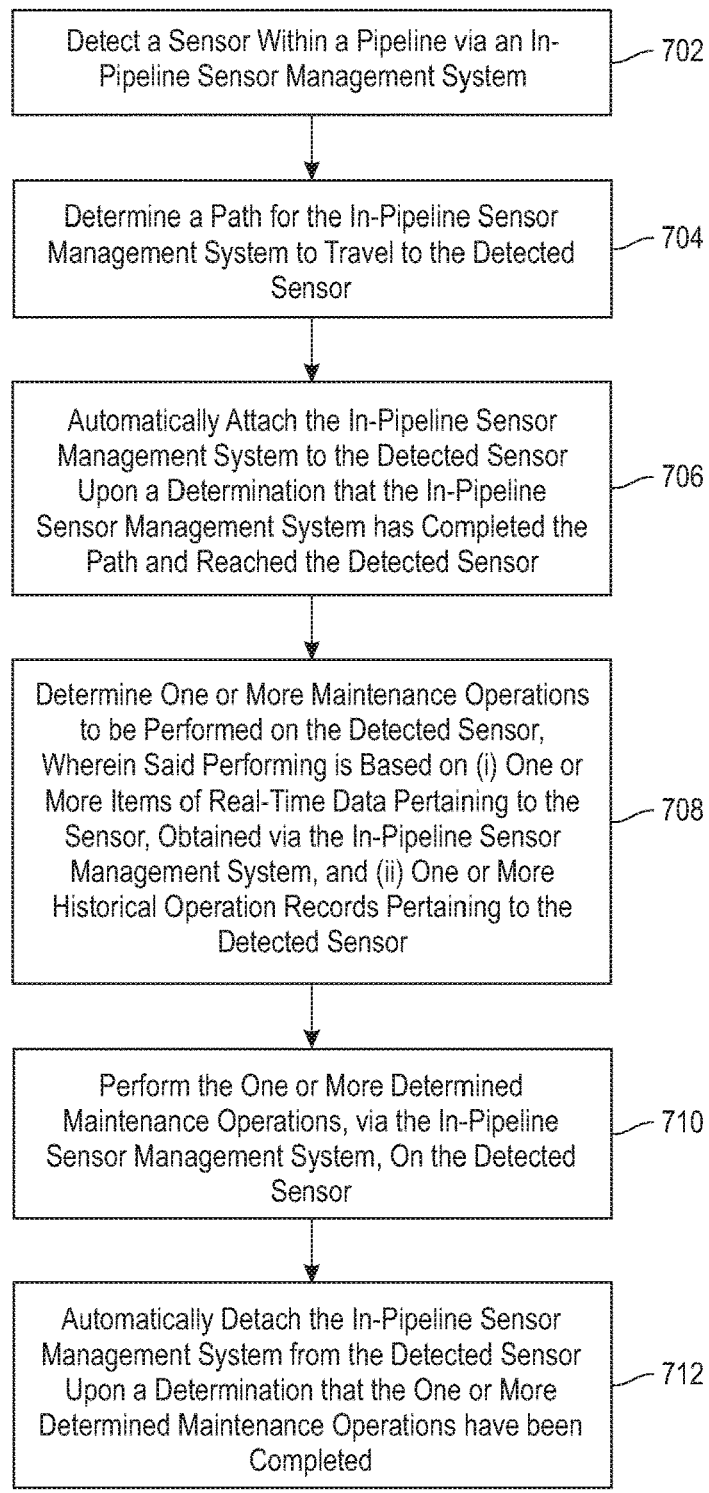
FIG. 7 is a flow diagram illustrating techniques according to an embodiment of the invention.

FIG. 7 is a flow diagram illustrating techniques according to an embodiment of the present invention. Step 702 includes detecting a sensor within a pipeline via an in-pipeline sensor management system. Step 704 includes determining a path for the in-pipeline sensor management system to travel to the detected sensor. Step 706 includes automatically attaching the in-pipeline sensor management system to the detected sensor upon a determination that the in-pipeline sensor management system has completed the path and reached the detected sensor.

Step 708 includes determining one or more maintenance operations to be performed on the detected sensor, wherein said performing is based on (i) one or more items of real-time data pertaining to the sensor, obtained via the in-pipeline sensor management system, and (ii) one or more historical operation records pertaining to the detected sensor. The items of real-time data pertaining to the detected sensor can include one or more real-time images of the detected sensor.

Step 710 includes performing the one or more determined maintenance operations, via the in-pipeline sensor management system, on the detected sensor. Step 712 includes automatically detaching the in-pipeline sensor management system from the detected sensor upon a determination that the one or more determined maintenance operations have been completed.

Additionally, the techniques depicted in FIG. 7 can also include modifying the determined path based on (i) the current location of the in-pipeline sensor management system within the pipeline, (ii) one or more flow conditions within the pipeline, and (iii) a determined amount of remaining energy associated with the in-pipeline sensor management system.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
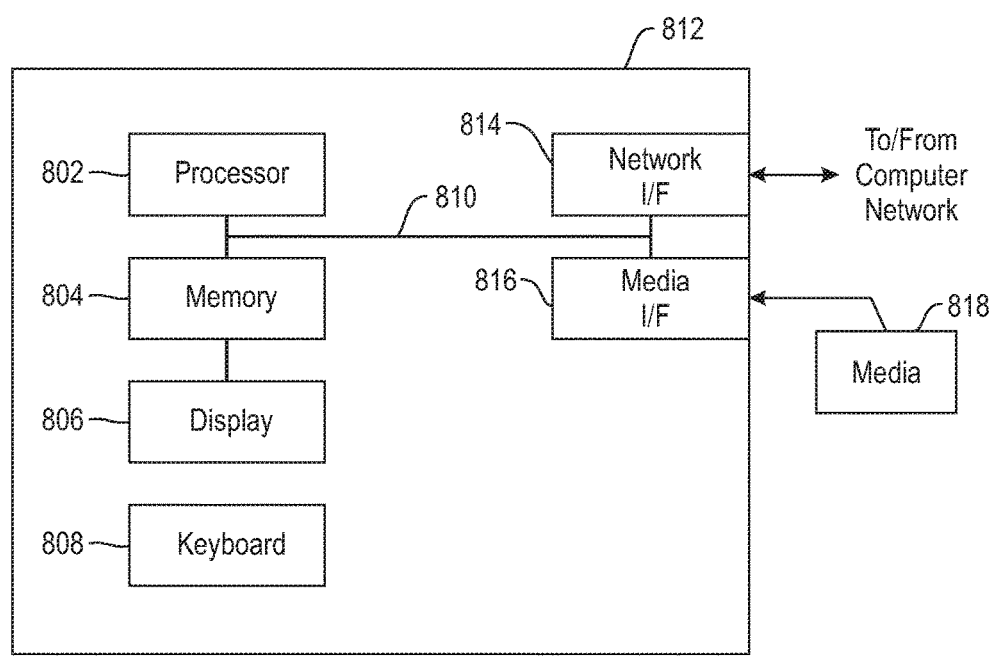
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
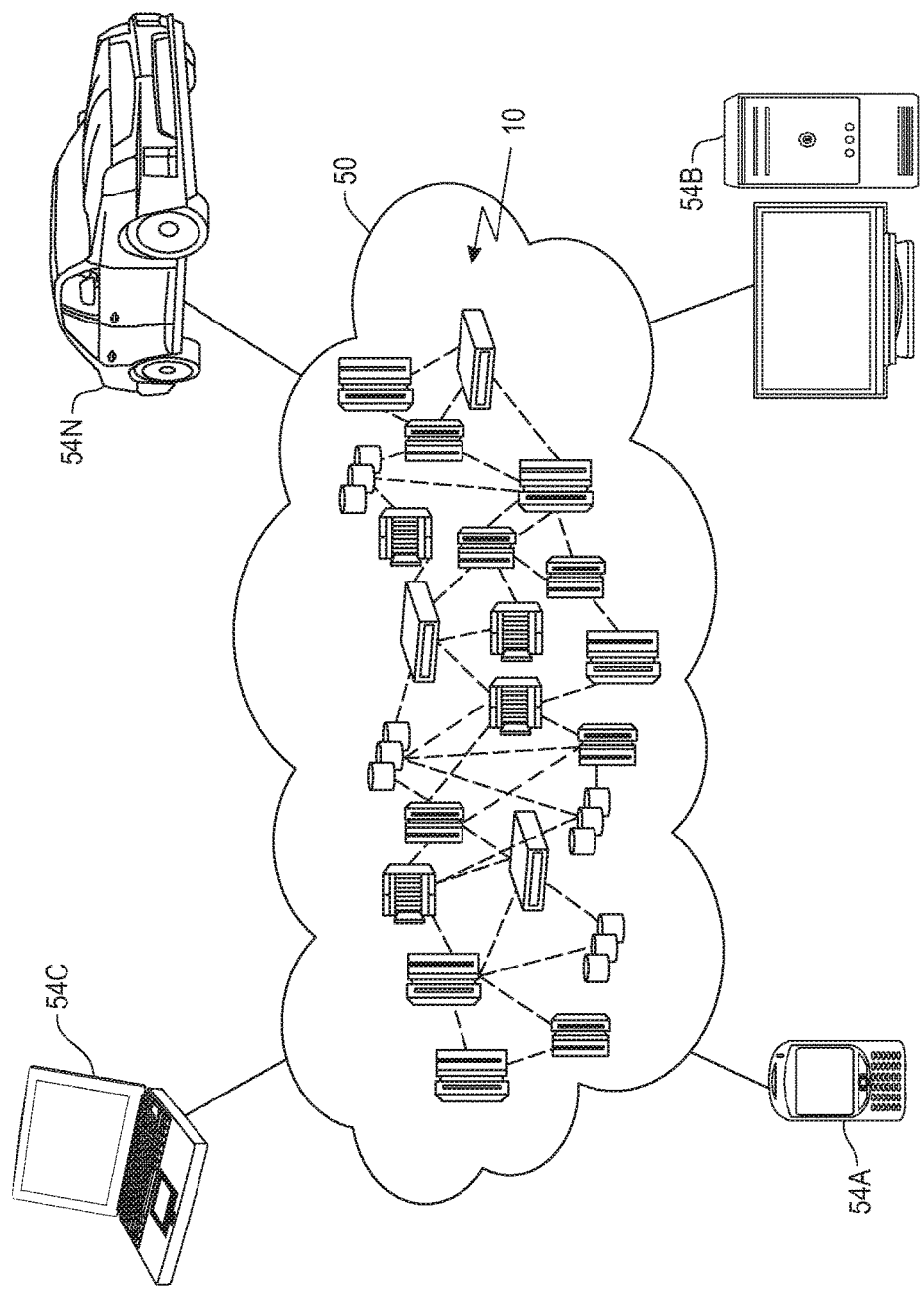
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
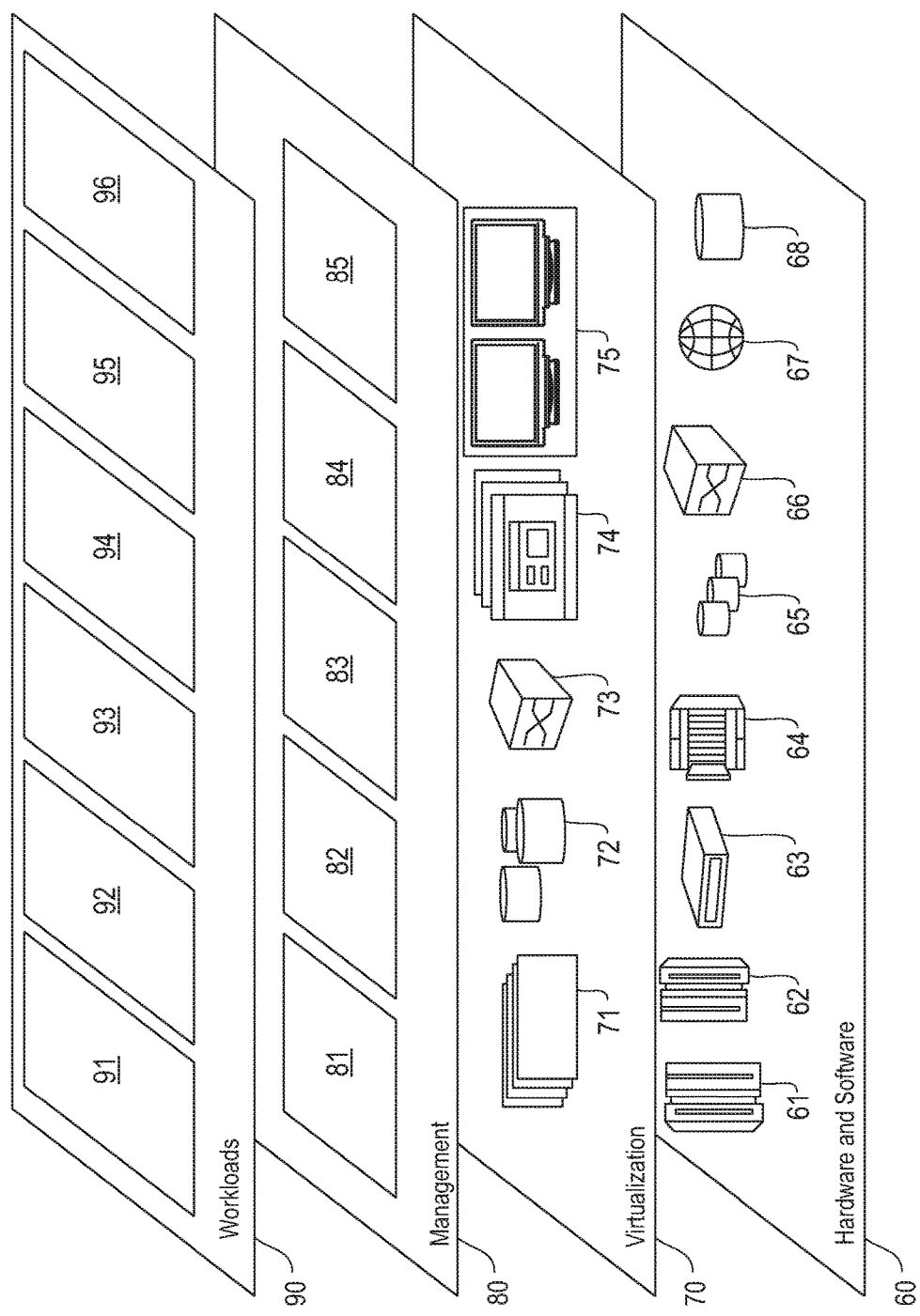
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-pipeline management of sensors 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating a telescopic mechanism using nano-fabricated synthetic adhesive elements that provides attachment and detachment of the multicomponent sensor management system to a sensor body located inside a pipe.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multi-component, in-pipeline sensor management system, comprising:
   a self-propelled sensor explorer component comprising (i) one or more communication sub-components and (ii) one or more navigation assistance sub-components, wherein the self-propelled sensor explorer component is configured to move through a liquid within a pipeline;
   a sensor coupling unit comprising one or more attachment structures, wherein the one or more attachment structures enable the system to attach to one or more sensors within the pipeline; and
   a sensor maintenance unit comprising (i) a cleansing unit, wherein the cleansing unit comprises (a) an inlet valve for one or more cleaning liquids and (b) an outlet valve for one or more waste liquids, (ii) a cleaning liquid storage component coupled to the inlet valve, and (iii) a waste liquid collector coupled to the outlet valve;
   wherein (i) the self-propelled sensor explorer component, (ii) the sensor coupling unit, and (iii) the sensor maintenance unit are physically linked and communicatively linked within the system.

2. The multi-component, in-pipeline sensor management system of claim 1, comprising:
   a predictive management unit comprising one or more system diagnostics components, wherein the one or more system diagnostics components formulate one or more system-related predictions based on (i) information pertaining to the environment within the pipeline and (ii) communication from the system, and wherein the predictive management unit is wirelessly linked to the system.

3. The multi-component, in-pipeline sensor management system of claim 1, comprising:
   one or more energy producing mechanisms that utilize liquid flowing within the pipeline to produce energy.

4. The multi-component, in-pipeline sensor management system of claim 1, wherein the one or more navigation assistance sub-components comprises a sub-component configured for detecting the location of one or more sensors within the pipeline.

5. The multi-component, in-pipeline sensor management system of claim 1, wherein the one or more navigation assistance sub-components comprises a sub-component configured for maintaining the position of the system in the pipeline.

6. The multi-component, in-pipeline sensor management system of claim 1, wherein the one or more navigation assistance sub-components comprises one or more cameras.

7. The multi-component, in-pipeline sensor management system of claim 1, wherein the one or more attachment structures comprise one or more nano-pillared structures coated with a synthetic glue.

8. The multi-component, in-pipeline sensor management system of claim 7, wherein the synthetic glue comprises an organic catechol coating.

9. The multi-component, in-pipeline sensor management system of claim 1, wherein the sensor coupling unit comprises a telescopic mechanism configured to raise and lower the sensor coupling unit.

10. The multi-component, in-pipeline sensor management system of claim 1, wherein the cleaning liquid storage component is partitioned for storage of one or more distinct cleaning liquids and collection of one or more waste liquids.

11. The multi-component, in-pipeline sensor management system of claim 1, wherein the one or more cleaning liquids comprise one or more chemical cleaning liquids.

12. The multi-component, in-pipeline sensor management system of claim 1, wherein the cleansing unit comprises a surface inclined to facilitate liquid removal.

13. The multi-component, in-pipeline sensor management system of claim 1, wherein the cleansing unit comprises one or more cameras.

14. The multi-component, in-pipeline sensor management system of claim 1, wherein the cleansing unit comprises one or more light-emitting diodes for optical cleaning.

* * * * *